United States Patent [19]
Cairns

[11] Patent Number: 5,498,098
[45] Date of Patent: Mar. 12, 1996

[54] TWO-PIECE CLAMPING ASSEMBLY

[75] Inventor: James W. Cairns, Westchester, Pa.

[73] Assignee: Nolu Plastics, Inc., Aston, Pa.

[21] Appl. No.: 339,276

[22] Filed: Nov. 10, 1994

[51] Int. Cl.$^6$ .................................................... F16B 7/04
[52] U.S. Cl. ..................... 403/400; 403/396; 403/340; 248/231.61
[58] Field of Search ..................................... 403/400, 388, 403/389, 391, 394, 384, 385, 403, 408.1, 373, 396, 397, 24, 339, 340, 186, 167; 182/179; 211/182; 248/231.6; 198/836.2, 836.4; 24/335, 339, 569; 256/69, 68

[56] References Cited

U.S. PATENT DOCUMENTS

| | | |
|---|---|---|
| 1,631,831 | 6/1927 | Palmer-Jones . |
| 1,950,635 | 6/1930 | Steinmayer . |
| 2,733,035 | 1/1956 | Rocheleau . |
| 2,942,898 | 6/1960 | Matthysse ........................ 403/400 X |
| 2,942,899 | 6/1960 | Rifken . |
| 3,025,089 | 3/1962 | Ramsden . |
| 3,096,110 | 7/1963 | Cantor . |
| 3,677,584 | 7/1972 | Snort . |
| 4,784,514 | 11/1988 | Paniev . |
| 5,335,782 | 8/1994 | Herzog ............................... 198/836.3 |

FOREIGN PATENT DOCUMENTS

| | | | |
|---|---|---|---|
| 765287 | 3/1934 | France ................................. 403/385 |
| 1132329 | 10/1956 | France ................................. 403/400 |
| 361920 | 8/1938 | Italy ..................................... 403/400 |
| 486900 | 11/1953 | Italy ..................................... 403/400 |
| 1567165 | 5/1980 | United Kingdom .................. 403/391 |

*Primary Examiner*—Kenneth J. Dorner
*Assistant Examiner*—Harry C. Kim
*Attorney, Agent, or Firm*—Cushman Darby & Cushman

[57] ABSTRACT

A two-piece clamping assembly includes a first clamp member and a second clamp member constructed and arranged to cooperate to define first and second pin bores. The first bore is disposed generally transverse with respect to the second bore. A rod is threaded into an axial bore through a portion of the first clamp member and extends through the second clamp member beyond an end surface thereof. A control knob is coupled to the end of the rod. The control knob includes a seating surface constructed and arranged to engage the end surface of the second clamp member, whereby manual movement of the control knob such that the seating surface contacts the end surface, clamps the second clamp member between the first clamp member and control knob so as to clamp associated pins in the pin bores. The first and second clamp members are constructed and arranged in such a manner that all operative threads of the rod are disposed within the axial bore.

9 Claims, 4 Drawing Sheets

5,498,098

TWO-PIECE CLAMPING ASSEMBLY

BACKGROUND OF THE INVENTION

The present invention relates to a clamping assembly, and, more particularly, to a clamping assembly for use in clamping guide rails to support structure of a conveyor system.

Conveyor systems are commonly employed for transporting containers during the filling, sealing and/or labelling process and typically include guide or side rails to guide and contain the containers as they move along a moveable track. Since the conveyor track may extend a significant distance, a plurality of clamping block assemblies are provided to support and hold the guide rails at various locations along the track.

When a variety of products are to be processed with a single conveyor system, it is often necessary to adjust the position of the guide rails depending upon the size and type of product, whether it is a container or some other component. Thus, it may be necessary to move the guide rails toward or away from the center of the track or upwardly or downwardly with respect to the track so as to insure that the products are guided adequately by the guide rails.

In adjusting the guide rails, each clamping block assembly must be individually manually adjusted to accommodate the particular product being processed. Typical clamping block assemblies include a bracket bolted to the conveyor support structure, a first pin extending vertically from the bracket, a clamping block frictionally engaged with the first pin and a second pin frictionally engaged with the clamping block and extending in a direction transverse to the first pin. A distal end of the second pin typically includes a clamp for receiving and holding one or more guide rails. The vertical position of the second pin and thus the guide rail, may be adjusted by moving the clamping block, together with the second pin, with respect to the first pin. The lateral position of the second pin and thus the guide rail, may be adjusted by moving the second pin with respect to the clamping block.

Certain conventional clamping block assemblies require that each pin be independently adjusted, which is time consuming and may require the use of special tools. Other assemblies are adapted to simultaneously unlock the pins to facilitate the adjustments, but recently proposed structures of this type require a two-handed release which makes it difficult to maintain the assembly in a desired position during locking. For example, it is difficult to maintain the proper vertical and horizontal positions of the pins while clamping the pins to the clamping block; therefore, adjusting the guide rails for particular product containers with this type of assembly may be at times difficult and time consuming.

Another deficiency of many conventional clamping block assemblies is that they have complicated configurations resulting in structural irregularities, including cavities and notches formed in surfaces thereof. Further, in certain assemblies, screw threads or other mechanical components may be exposed. As a result, dirt and debris can collect in the cavities, notches and the like, making the assembly difficult to clean. This in turn can create problems in meeting Food and Drug Administration (FDA) regulations.

SUMMARY OF THE INVENTION

An object of the present invention is to provide a clamping arrangement in which both the vertical and horizontal pins can be released with one hand while they are supported by the other and thereafter can be adjusted easily.

Another object of the invention is to provide a clamping arrangement having a smoothly contoured, generally continuous peripheral surface with minimal exposed cavities, notches and the like, whereby the collection of dirt and debris is minimized and the structure can be easily cleaned so as to minimize any potential FDA problems.

In accordance with the principles of the present invention, these objectives are obtained by providing a two-piece clamping assembly including a first clamp member and a second clamp member constructed and arranged to cooperate to define first and second pin bores. An axis of the first pin bore is disposed generally transverse with respect to an axis of the second pin bore. A rod is threaded into an axial bore through a portion of the first clamp member and extends through the second clamp member beyond an end surface thereof. A control knob is coupled to the end of the rod. The control knob includes a seating surface constructed and arranged to engage the end surface of the second clamp member, whereby manual movement of the control knob such that the seating surface contacts the end surface, clamps the second clamp member between the first clamp member and control knob so as to clamp associated pins in the pin bores.

The first and second clamp members are constructed and arranged in such a manner that all operative threads of the rod are disposed within the axial bore.

The first and second clamp members are configured so as to define a generally smoothly contoured outer peripheral surface which may be cleaned easily.

Another object of the present invention is the provision of a clamping block of the type described, which is simple in construction, effective in operation and economical to manufacture and maintain.

Other objects, features and characteristics of the present invention, as well as the methods of operation and functions of the related elements of the structure, the combination of the parts and the economies of manufacture will become more apparent upon consideration of the following detailed description and appended claims with reference to the accompanying drawings, all of which form a part of the specification.

DETAILED DESCRIPTION OF THE PRESENTLY PREFERRED EXEMPLARY EMBODIMENTS

Figure 1:
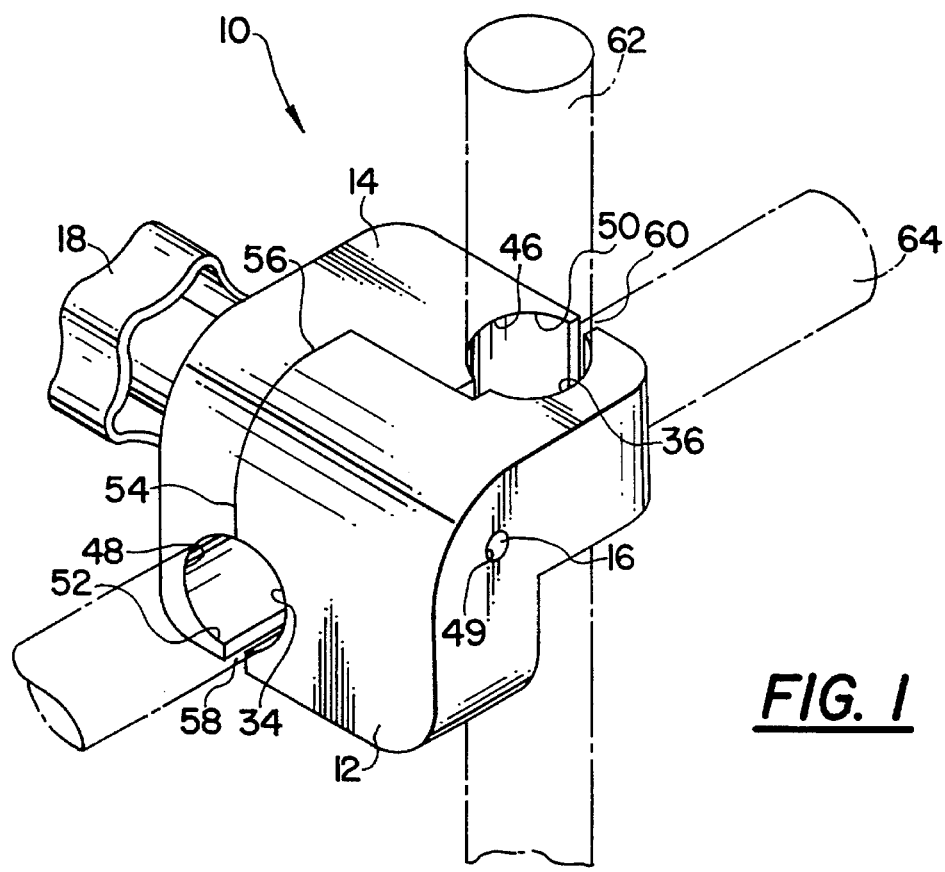
FIG. 1 is a perspective view of a two-piece clamping assembly provided in accordance with the principles of the present invention, shown with conventional pins clamped therein.
Figure 4:
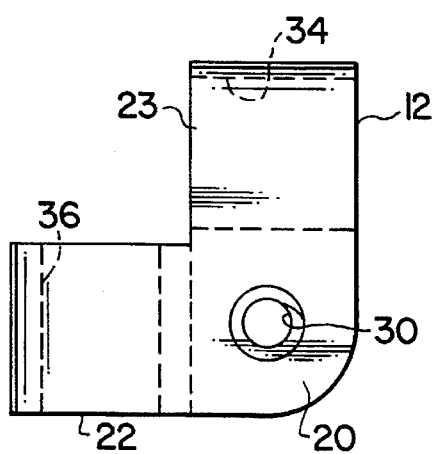
FIG. 4 is a view of the first clamp member of FIG. 2 as viewed from the left side thereof.
Figure 3:
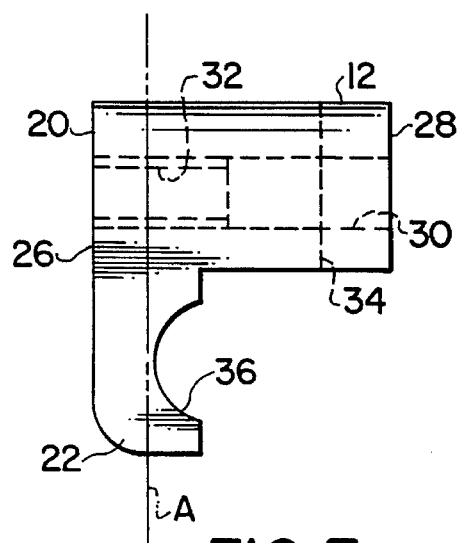
FIG. 3 is a view of the first clamp member of FIG. 2 as viewed from below.
Figure 2:
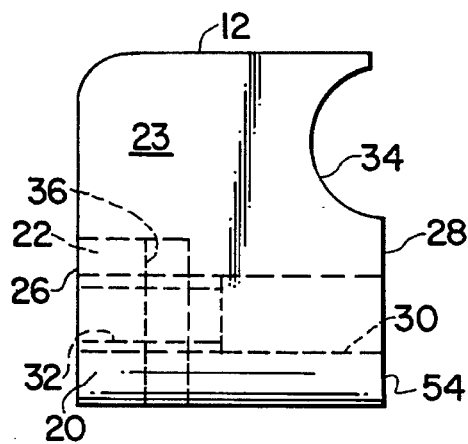
FIG. 2 is a plan view of a first clamp member of the clamping assembly provided in accordance with the invention.
Figure 5:
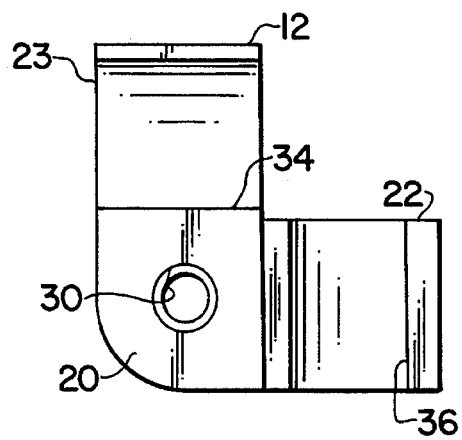
FIG. 5 is a view of the first clamp member of FIG. 2 as viewed from the right side thereof.
Figure 6:
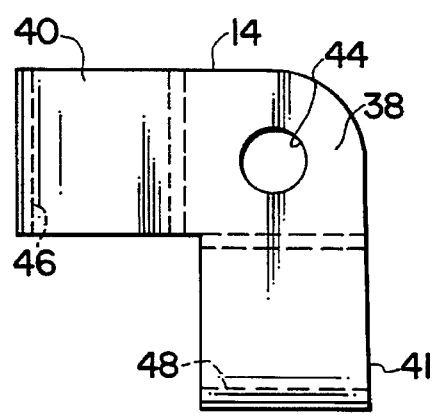
FIG. 6 is a top plan view of the second clamp member of the clamping assembly, provided in accordance with the invention.
Figure 8:
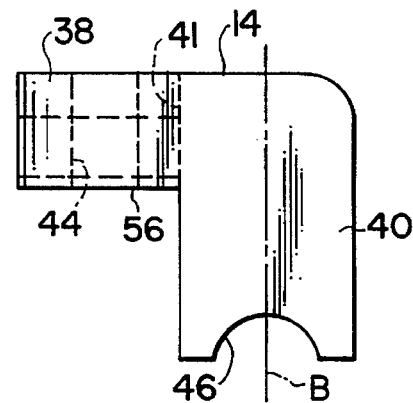
FIG. 8 is a view of the second clamp member of FIG. 6 as viewed from behind.
Figure 7:
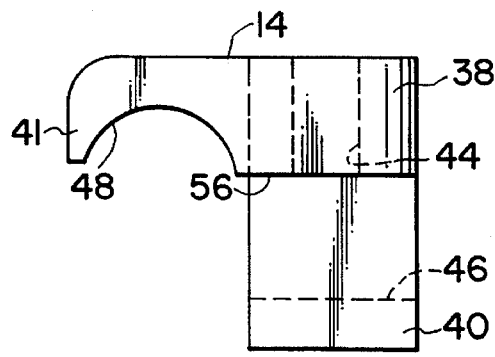
FIG. 7 is view of the second clamp member of FIG. 6 as viewed from the right side thereof.
Figure 9:
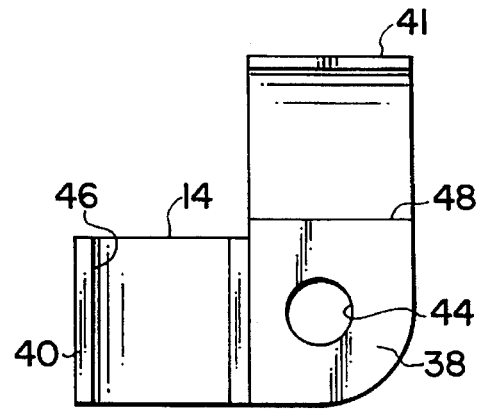
FIG. 9 is a view of the second clamp member of FIG. 6 as viewed from the bottom.
Figure 10:
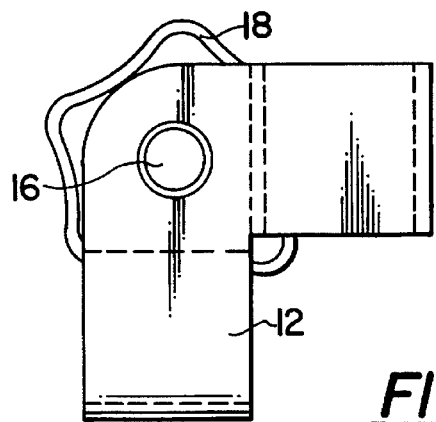
FIG. 10 is an end view of the two-piece clamping assembly of the invention.
Figure 11:
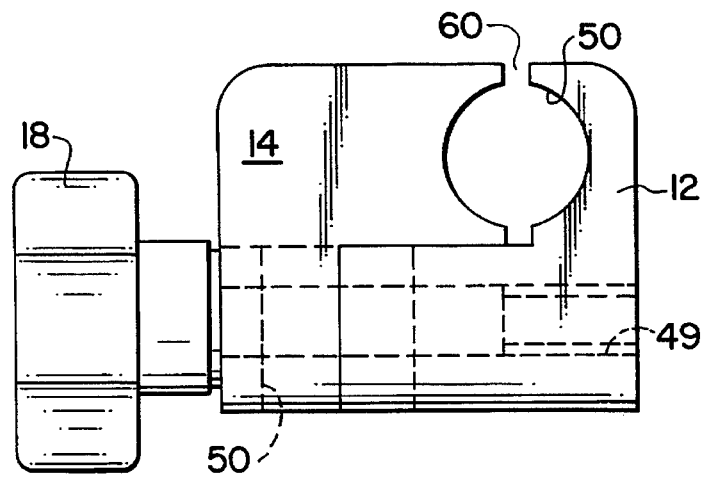
FIG. 11 is a top plan view of the two-piece clamping assembly of the invention.
Figure 12:
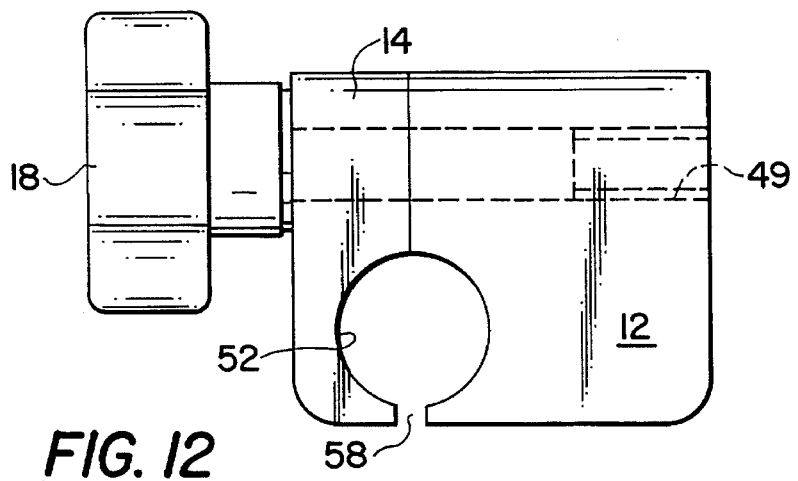
FIG. 12 is a left side view of the two-piece clamping assembly of the invention.

With reference to FIG. 1, a two-piece clamping assembly, generally indicated at 10, is shown. The clamping assembly 10 includes a first clamp member, generally indicated at 12, a second clamp member, generally indicated at 14, a rod 16, at least part of which is threaded, and a control knob 18 coupled to one end of the rod 16.

As shown in FIGS. 2–5, the first clamp member 12 has a first core portion 20 and first and second arms 22 and 23 extending from the core portion 20 in a direction generally transverse to each other. The core portion 20 has first and second ends 26 and 28, respectively. A bore 30 extends through the core portion 20, between the ends 26 and 28, in a direction generally traverse to a longitudinal axis A of the first arm 22. In the illustrated embodiment, a portion 32 of the bore 30 is threaded at first end 26. It can be appreciated that bore 30 need not extend through the core portion, but may extend at least part-way from end 28 toward end 26. Further, the entire bore 30 may be threaded if desired. Alternatively, a threaded insert, preferably of metal, may be disposed in the bore 30 defining internal threads thereof.

The first arm 22 includes a part-cylindrical recess 36 extending the length thereof. The second arm 23 also includes a part-cylindrical recess 34 extending the length thereof and having a longitudinal axis disposed generally transverse to a longitudinal axis of recess 36.

As best shown in FIGS. 6–9, the second clamp member 14 has a second core portion 38 and first and second arms 40 and 41 extending from the core portion 38 in a direction generally transverse to each other. The core portion 38 includes a bore 44 therethrough extending generally parallel to a longitudinal axis B of the first arm 40.

The first arm 40 includes a part-cylindrical recess 46 in a surface thereof. The second arm 41 also includes a part-cylindrical recess 48 in a surface thereof. A longitudinal axis of recess 48 is disposed generally transverse to a longitudinal axis of recess 46.

With reference to FIG. 1, the first and second clamp members 12 and 14 are constructed and arranged to cooperate such that the bore 30 of the first clamp member 12 aligns with the bore 44 of the second clamp member 14 defining an axial bore 49, and recess 36 of the first arm 22 and recess 46 of first arm 40, cooperate to define a first pin holding bore 50. Recess 34 of the second arm 23 and recess 48 of second arm 41 cooperate to define a second pin holding bore 52 disposed generally transverse with respect to the first pin holding bore 50 (FIG. 1).

As shown in FIG. 1, when surface 54 of the first clamp member 12 and surface 56 of second clamp member 14 are engaged, gaps 58 and 60 are formed such that the surfaces defining the pin holding bores 50 and 52 do not completely surround the associated pins 62 and 64, inserted thereinto. Such an arrangement ensures that the clamping assembly 10 may accommodate pins of various diameters.

The terms "first" and "second" used in describing the clamping assembly are for convenience only.

Figure 13:
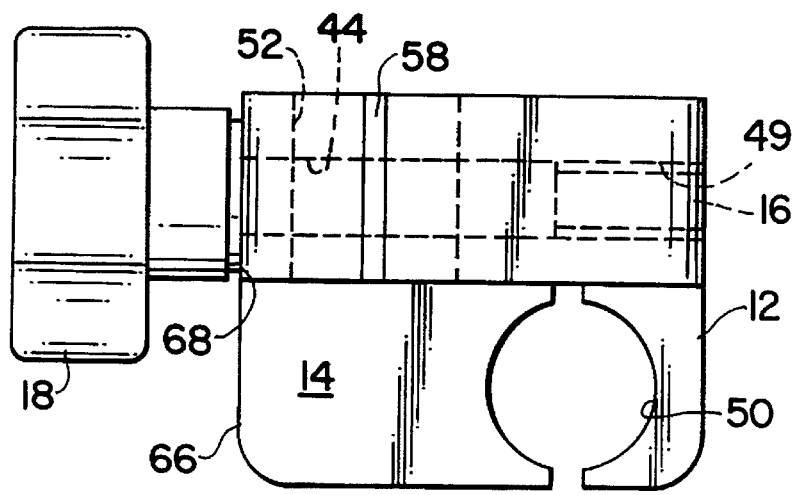
FIG. 13 is a bottom plan view of the two-piece clamping assembly of the invention.

With reference to FIG. 13, a rod 16 having screw threads defined along at least a portion thereof is in threaded engagement with the threaded portion 32 of bore 30 and has an end extending through bore 44 beyond an end surface 66 of core portion 38. The control knob 18 is coupled to the proximal end of the rod 16. The control knob 18 includes a seating surface 68 for engaging the end surface 66. Thus, the rod 16 is constructed and arranged with respect to the first clamp member 12, the second clamp member 14 and the control knob 18 such that when the clamping assembly 10 is clamping the pins, threads of the rod 16 are not exposed to the environment.

It can be appreciated that the control knob 18 need not be adjacent the second clamp member 14 but may be disposed on the opposite side of the assembly, adjacent the first clamp member 12. In this case, at least a portion of the bore 44 would be threaded or provided with a threaded insert therein, for engaging the threads of rod 16.

The clamping assembly 10 has a generally L-shape having a smoothly contoured peripheral surface which minimizes notches, exposed threads or other areas where dirt and debris may collect.

Figure 14:
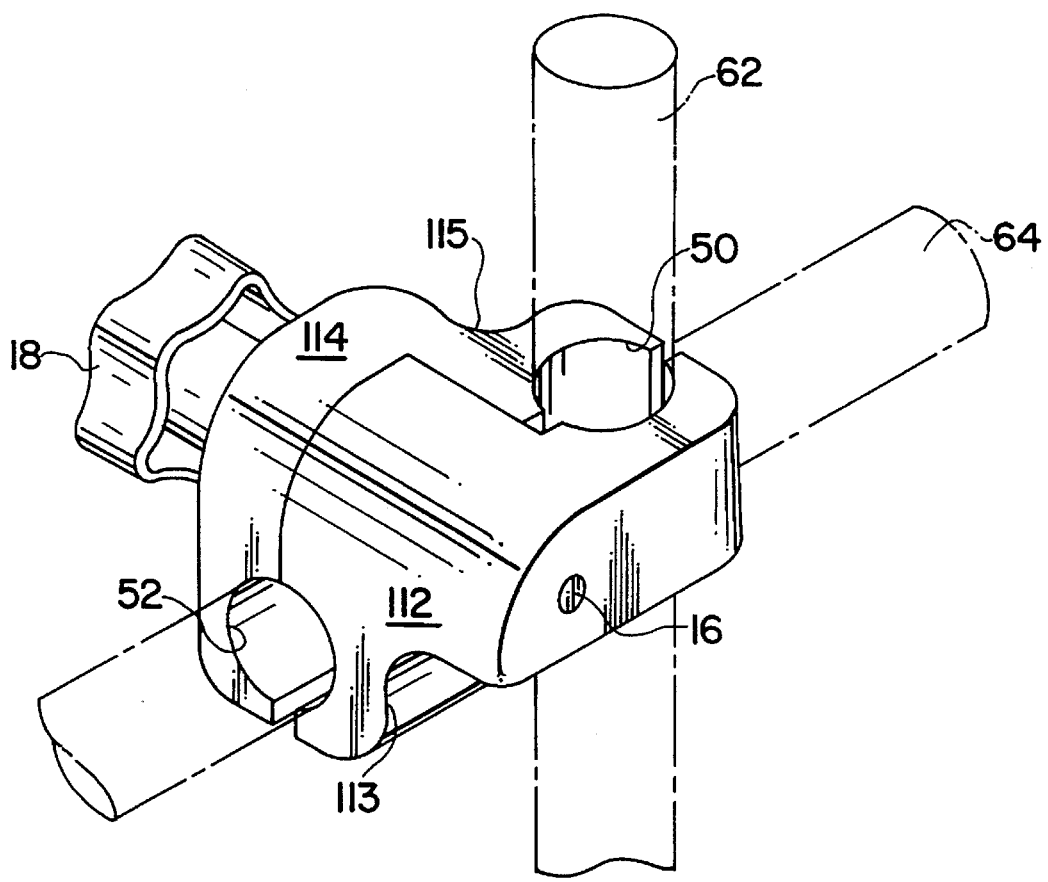
FIG. 14 is a view similar to FIG. 1 of a molded two-piece clamping assembly provided in accordance with the invention.

The first and second clamp members 12 and 14 may be machined or molded. Machined members may be made from polyester, polyvinylchloride (PVC) or the like. However, it is preferable to mold these members from Acetal, reinforced nylon or other suitable moldable materials, to reduce manufacturing cost. Thus, with reference to FIG. 14, molded first and second clamp members are shown. The first and second clamp members 112 and 114 each have a respective cutout 113, 115 therein. These cutouts are provided to reduce the raw material required for the clamp members and to ensure proper molding, without shrinkage. In all other aspects, members 112 and 114 are generally similar to members 12 and 14, respectively, of FIGS. 1–13.

With reference to FIGS. 1 and 10–12, it can be appreciated pin 64 may be coupled to a guide rail while pin 62 may be coupled to a bracket which in turn may be coupled to the support structure of the conveyor system (not shown). Manual movement of the control knob 18 such that the seating surface 68 contacts the end surface 66 of the second clamp member 14, clamps the second clamp member between the first clamp member 12 and control knob 18, clamping the pins 62, 64 between the first and second clamp members. The first and second clamp members 12 and 14 are constructed and arranged in such a manner that all threads of the rod 16 are disposed within the axial bore 49.

To insert the pins 62 and 64 within the holding bores 50 and 52, the control knob 18 is turned to reduce threaded engagement of the rod 16 with the threaded portion 32 of bore 30 enough that the pins 62 and 64 may be inserted thereinto. When the proper adjustment of the horizontal and vertical positions of the pins 62 and 64 is achieved, the first and second clamp members 12 and 14 are held with one hand while the control knob is tightened with the other hand to clamp the pins within the clamping assembly 10.

When it is desired to adjust the vertical and horizontal location of the guide rails, the first and second clamp members 12 and 14 are simply held with one hand while the control knob 18 is turned with the other hand to reduce the frictional clamping force of the pins 62 and 64 such that the pins are free to slide relative to the clamping assembly 10. The operator can then move the clamping assembly with one hand and adjust both the vertical and horizontal positions of the guide rail by moving pins 62 and 64 relative to the first and second clamp members. Once the pins and thus the guide rails are in the desired position, the operator may use his other hand to tighten the control knob to clamp the pins 62 and 64 within the clamping assembly 10.

It is thus been seen that the two-piece clamping assembly of the invention provides an simple and effective way to manually adjust the relative positions of guide rails or similar devices quickly and easily. Further, the smoothly contoured outer peripheral surface of the clamping assembly reduces the likelihood of product contamination by minimizing the places were dirt may accumulate thereon.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit scope of the appended claims.

What is claimed is:

1. A clamping assembly comprising:

a first clamp member having a first core portion and first and second arms extending from the first core portion in directions generally transverse to each other, said first core portion including a first bore therethrough extending in a direction generally transverse to a longitudinal axis of said first arm, at least a portion of said first bore defining screw threads, each said first and second arm having a recess therein, a second clamp member having a second core portion and first and second arms extending from the second core portion in a direction generally transverse to each other, said second core portion including a second bore therethrough extending generally parallel to a longitudinal axis of said first arm thereof, each said first and second arm of said second clamp member having a recess therein, said first and second clamp members being constructed and arranged to cooperate such that said first bore aligns with said second bore to define an axial bore, said recess of said first arm of said first clamp member and said recess of said second arm of said second clamp member cooperate to define a first pin holding bore and said recess of said second arm of said first clamp member and said recess of said first arm of said second clamp member cooperate to define a second pin holding bore disposed generally transverse with respect to said first pin holding bore, a rod having first and second ends and a portion thereof defining screw threads, said rod being threaded into said portion of said first bore and extending through said axial bore and beyond an end surface of said second core portion; and a control knob coupled to said second end of said rod, said control knob including a seating surface constructed and arranged to engage said end surface of said second core portion, whereby, manual movement of said control knob such that said seating surface contacts said end surface, clamps the second clamp member between the first clamp member and the control knob so as to clamp associated pins in said pin holding bores.

2. The clamping assembly according to claim 1, wherein said first and second clamp members cooperate to define a smoothly contoured generally L-shaped configuration when in a clamping position.

3. The clamping assembly according to claim 1, wherein said first and second clamp members are made from Acetal.

4. The clamping assembly according to claim 1, wherein said first and second clamp members are made from reinforced nylon.

5. The clamping assembly according to claim 1, wherein said first and second clamp members are made from polyester.

6. The clamping assembly according to claim 1, wherein said first and second clamp members are made from polyvinylchloride.

7. The clamping assembly according to claim 1, wherein, in a clamping position, a surface of said first clamp member and a surface of said second clamp member are engaged, defining gaps adjacent each of said pin holding bores such that surfaces defining said pin holding bores do not completely surround an associated pin when clamped therein.

8. The clamping assembly according to claim 1, wherein said recesses are part-circle recesses defining said pin holding bores of generally cylindrical configuration.

9. The clamping assembly according to claim 1, wherein said first and second clamp members are constructed and arranged in such a manner that all said screw threads of said rod are disposed substantially within the axial bore.

* * * * *